Nov. 10, 1925.   1,560,685
G. H. GILMAN
IMPACT TESTING APPARATUS
Filed Aug. 23, 1920   3 Sheets-Sheet 1
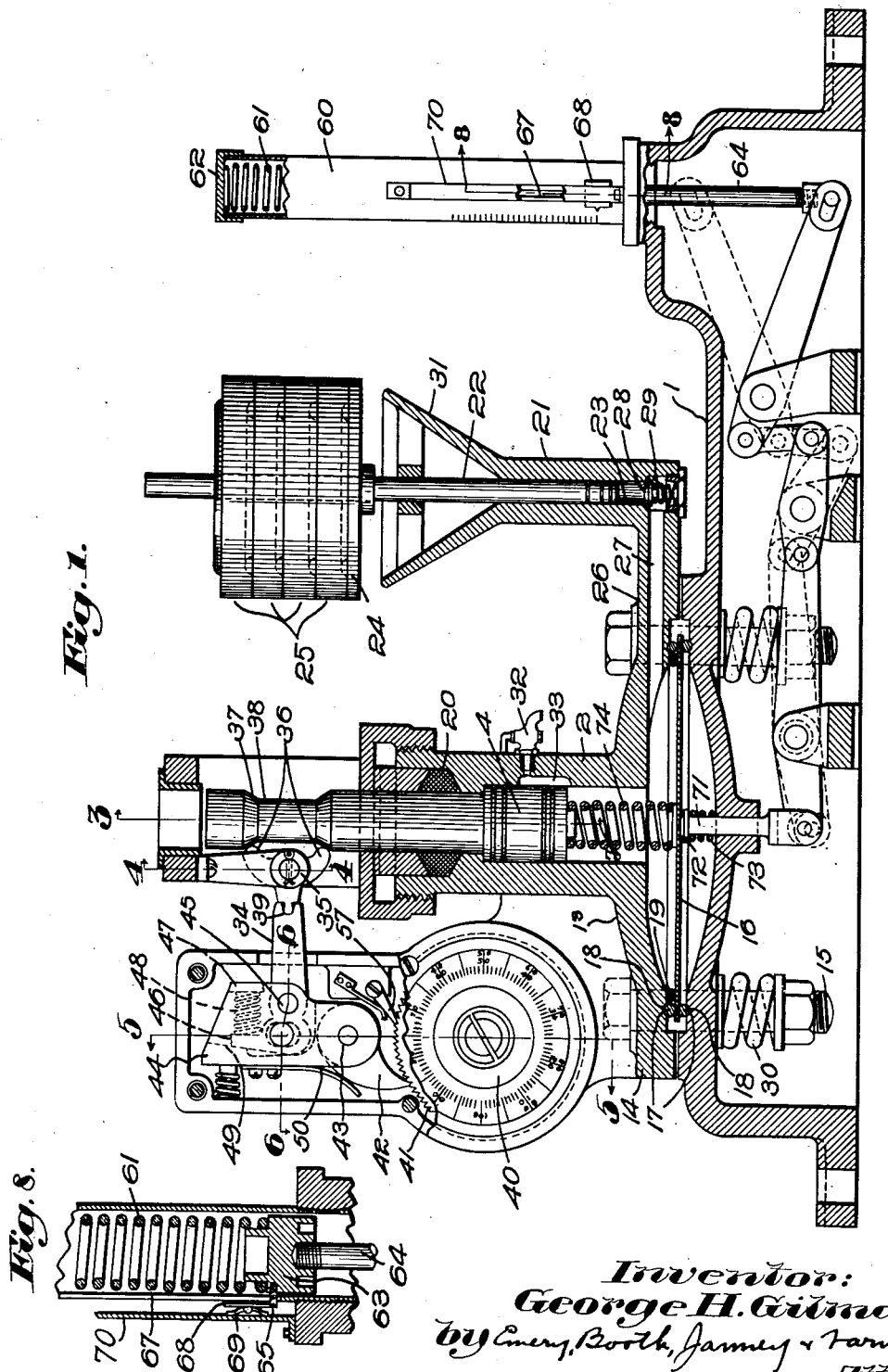
Inventor:
George H. Gilman
by Emery, Booth, Janney & Varney
Attys Nov. 10, 1925.
G. H. GILMAN
1,560,685
IMPACT TESTING APPARATUS
Filed Aug. 23, 1920      3 Sheets-Sheet 2
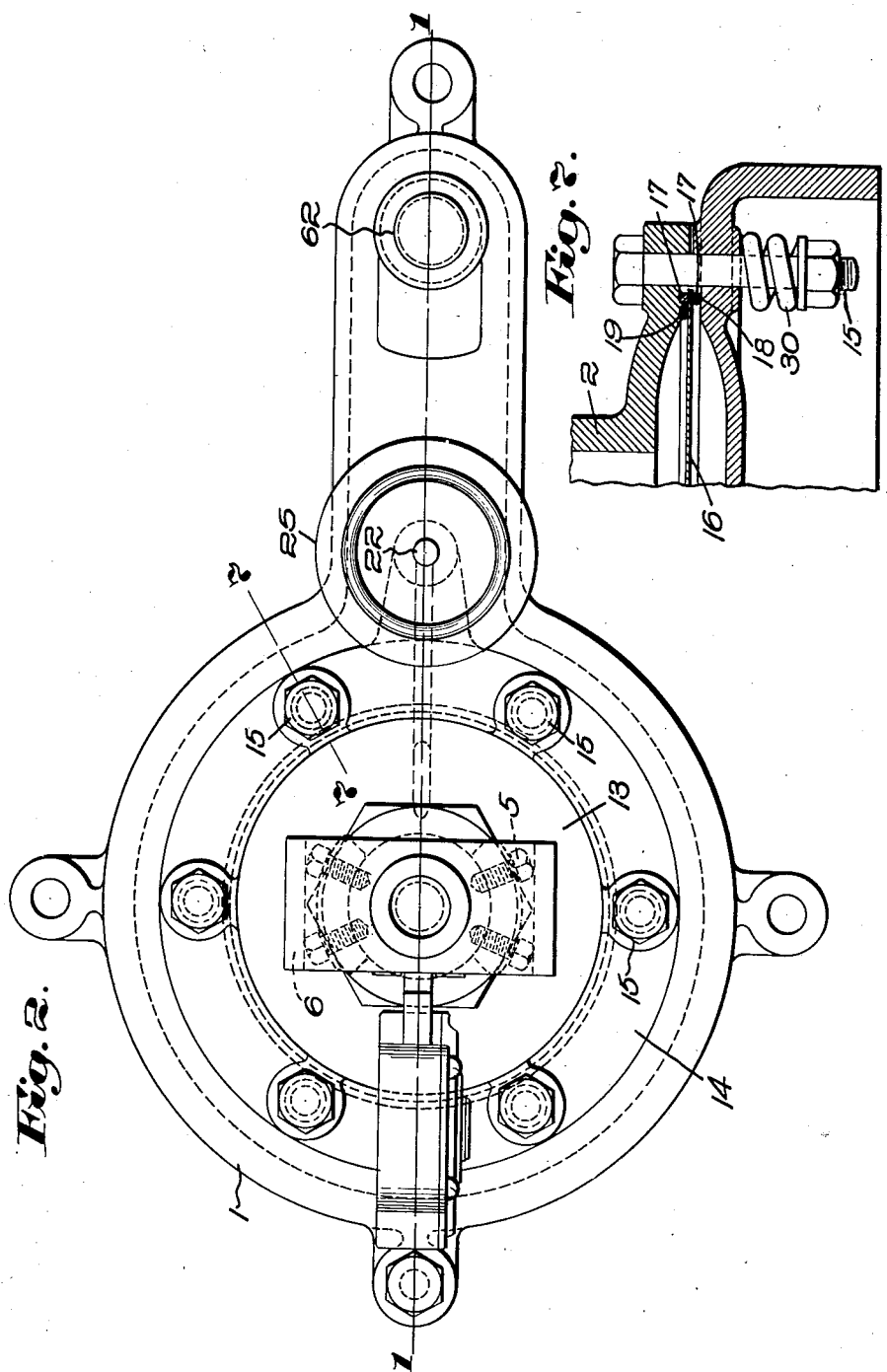
Inventor:
George H. Gilman
by Emery, Booth, Janney & Varney
Attys.

Nov. 10, 1925.
G. H. GILMAN
1,560,685
IMPACT TESTING APPARATUS
Filed Aug. 23, 1920    3 Sheets-Sheet 3
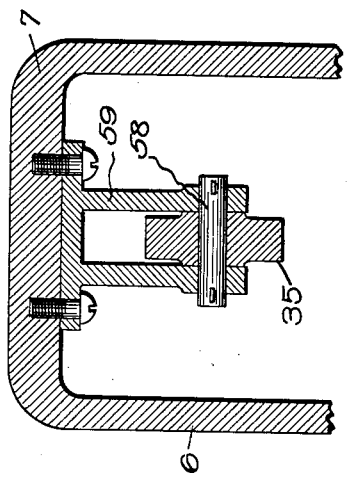
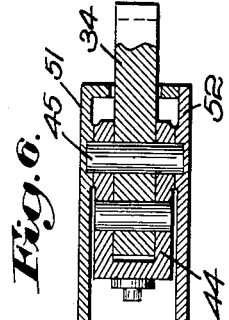
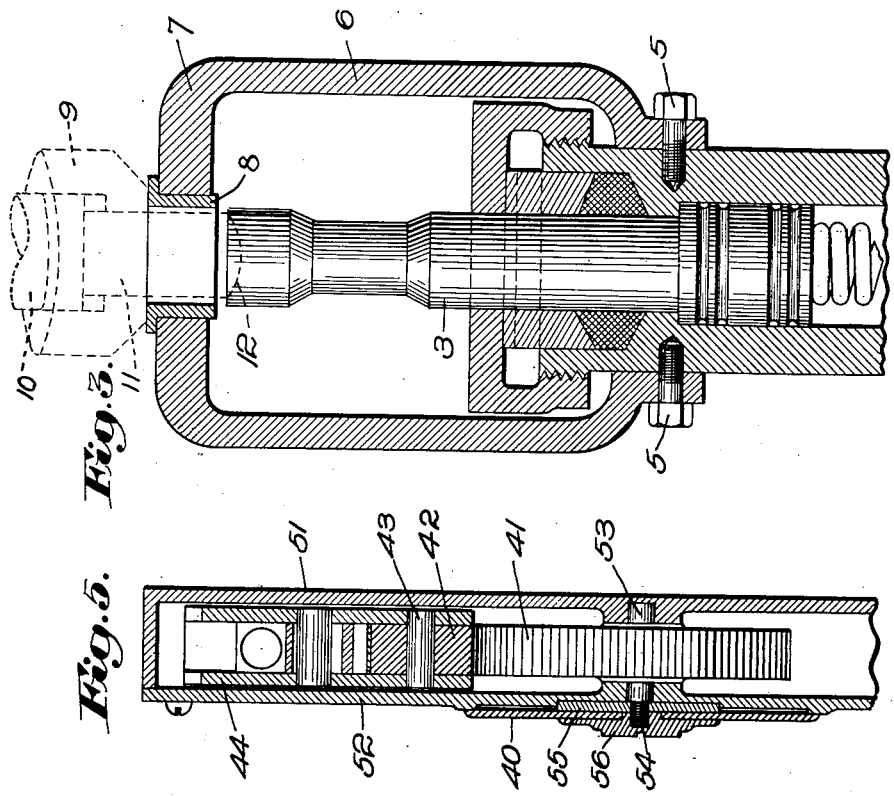
Inventor:
George H. Gilman,
by Emery, Booth, Janney & Varney
Attys.

Patented Nov. 10, 1925.

1,560,685

UNITED STATES PATENT OFFICE.

GEORGE H. GILMAN, OF BOSTON, MASSACHUSETTS.

IMPACT-TESTING APPARATUS.

Application filed August 23, 1920. Serial No. 405,501.

*To all whom it may concern:*

Be it known that I, GEORGE H. GILMAN, a citizen of the United States, and a resident of Boston, county of Suffolk, State of Massachusetts, have invented an Improvement in Impact-Testing Apparatus, of which the following description, in connection with the accompanying drawings, is a specification, like characters on the drawings representing like parts.

My invention relates to impact testing apparatus and more particularly but not exclusively to one for testing the characteristics of the impact produced by percussive tools such as pneumatic riveters and rock drills.

My invention will be best understood from the accompanying drawings when read in the light of the following description of a specific embodiment of my invention submitted for illustrative purposes, while its scope will be more particularly pointed out in the appended claims.

In the drawings:

Figure 1 shows a section on the line 1—1 of Fig. 2;

Fig. 2 is a plan of the submitted embodiment of my invention;

Figs. 3, 4, 5, and 6 are respectively sections on the lines 3—3, 4—4, 5—5 and 6—6 of Fig. 1;

Fig. 7 shows a section on the line 7—7 of Fig. 2; and

Fig. 8 shows on an enlarged scale a section on the line 8—8 of Fig. 1.

It is of importance to manufacturers and users of impact machines to determine accurately the characteristics of the impact produced. Heretofore this has been done by testing the machines under actual working conditions. When it is remembered that manufacturers of rock drills for example, must produce machines for drilling rocks varying from the hardness of granite to the softness of coal and from the toughness of copper ore to materials with opposite characteristics such as clay, it will be readily appreciated that it is difficult to obtain, for purposes of testing, the actual conditions under which such machines must operate. My invention among other things aims to reproduce these conditions by artificial means.

Referring to the drawings, for supporting the parts of the submitted embodiment of my invention I provide a suitable base 1. Mounted on the base is a cylinder member 2 which is provided with a plunger 3 having a head 4 reciprocably mounted in the cylinder member. Secured to the cylinder by suitable bolts 5 is a yoke member provided with the upstanding portions 6 and an upper portion 7, the latter being perforated to receive a bushing 8. The yoke member just referred to is adapted to support in operative relation to the plunger the instrument to be tested. Such an instrument is indicated in Fig. 3 by dotted lines showing an impact tool, commonly comprising a barrel 9, a hammer 10 and a striking pin or other part 11 adapted to be impacted by the hammer. The striking pin 11 is adapted to extend through the bushing 8 and rest on the upper surface 12 of the plunger while the barrel will be supported on the upper surface of the bushing or yoke.

The lower portion of the cylinder member 2 is flared as is indicated at 13 in Fig. 1 and integrally formed with this flared portion is a flange 14 adapted to be secured to the base by suitable bolts 15. Between the flange 14 and the base I mount a diaphragm 16 and for supporting the same adjacent its edge I provide members 17 which as shown are formed of rings circular in cross-section. The base and the flange are grooved as indicated at 18 to receive these rings. To prevent leakage I position between the diaphragm and the flange a suitable packing ring 19 of rubber or other suitable material which is adapted to be clamped between the diaphragm and flange in a manner readily understood by those skilled in the art. The rings 17 above referred to provide a rocker support for the edge of the diaphragm, the same being maintained in rolling contact therewith when it undergoes flexure. For permitting the proper occurrence of this action I may yieldingly secure the flange 14 of the cylinder member to the base 1 and for this purpose I provide the springs 30 which permit the cylinder member to raise slightly when the diaphragm undergoes flexure. For preventing leakage of fluid above the plunger I provide a suitable stuffing-box 20.

It will be seen that I have provided by means of the cylinder member, plunger and diaphragm just described, a chamber having two movable walls. This chamber is adapted to be filled with a suitable fluid preferably a liquid such as oil. Preferably I provide means for maintaining the liquid in this chamber under pressure and also means for replenishing leakage of such liquid. Although I may provide separate accumulators or other means for accomplishing these purposes I have shown a combined volumetric and pressure accumulator which performs all these functions. This accumulator comprises a cylinder member 21 which is bored to receive a reciprocable plunger 22 in fluid tight relation to the cylinder walls so as to provide a chamber 23 beneath the same. The upper portion of this plunger carries a platform 24 which is adapted to carry weights 25, the weights causing the fluid in the chamber 23 to be maintained under pressure. As will be readily understood, the pressure may be varied by varying the number of weights and by means of this pressure I am able to approximate the actual conditions under which the machine to be tested must operate in practice. For supporting the accumulator I have shown a bracket 26 formed integrally with the cylinder members 2 and 21. This bracket is provided with a conduit 27 connecting the chamber of the cylinder member 2 and the chamber 23 of the accumulator. For preventing the transmission of the impact effect on the liquid in the chamber of the cylinder member 2 to the chamber 23 of the accumulator I provide a check valve 28 adapted to be yieldingly held against its seat by means of a light spring 29. As will be readily understood, the check valve will permit flow from the accumulator to the cylinder member 2 and will prevent all flow in the opposite direction.

The upper portion of the accumulator cylinder is flared as at 31 to provide a funnel which may be used as a filling orifice when it is necessary to introduce the liquid into the parts of the machine. For removing air or other vapors from the fluid chambers of the machine when the same are being filled I provide a suitable cock 32 communicating by means of a groove 33 in the wall of the cylinder member 2 with the upper portion of the plunger chamber.

Suitable means are provided for measuring or registering the characteristics of the impact produced by the machine being tested, and for this purpose in the submitted embodiment of my invention I provide a suitable counter for recording the total number of blows and a gage for indicating the force of the blow.

The counter may be operated by any suitable means responsive to a condition created by the impact and as submitted is responsive to the motion of the plunger and for this purpose I have shown a positive means directly responsive to such movement. To this end I provide the counter with an operating arm 34 which is adapted to be actuated by a rocker 35 pivotally supported by a pin 58 carried by a supporting member 59 secured to the yoke by means of suitable screws. The rocker is provided with opposite fingers 36 having surfaces adapted to contact with the cam surfaces 37 which constitute the shoulders formed by the reduced portion 38 of the plunger. The reduced portion 38 and cam surfaces 37 are so formed that both fingers of the rocker are in constant engagement with the surface of the plunger. In this manner a positive connection is provided which prevents the occurrence of what is usually termed "backlash". The rocker is connected to the operating arm 34 of the counter by means of the gear tooth 39.

The counter is provided with a suitable dial plate 40 adapted to be actuated by means of a ratchet 41 and pawl 42, the pawl being pivoted at 43 to the pawl carrying member 44. The pawl carrying member is pivotally supported at 45 and is recessed to receive the operating member 34, the latter being likewise pivoted at 45. The operating member 34 is provided with a lug 46 and interposed between the same and the lug 47 on the pawl carrier 44 is a spring 48. This spring is adapted to hold the stop surface 49 of the pawl carrier against the lug 46 and for holding the pawl in engagement with the teeth of the ratchet 41 I provide a spring 50 secured to the pawl carrier. The operating parts for the dial of the counter are carried by a casing 51 which is provided with a cover 52, the cover and carrier being provided with oppositely disposed recesses for supporting the pivot pin 45 and further being provided with recesses providing bearings for the pivot pin 53. The pin 53 is keyed or otherwise secured in non-rotatable engagement with the ratchet and adjacent the dial is formed with a reduced screw threaded portion 54, which carries a washer 55 and a nut 56, the dial being clamped between the washer and the nut and thereby forced to turn with the ratchet. If desired, I may provide the ratchet with a spring-pressed holding pawl 57, in which case the dial is moved back to its zero position by loosening the nut 56 which permits it to be turned relative to the ratchet or the holding pawl may be omitted, in which case the dial may be turned to its zero position by continuing its forward motion until the zero position is reached.

In the operation of my device the motion of the plunger causes the operating arm of the counter to oscillate. On the downward stroke of the plunger the operating arm swings in the direction of the arrows in Fig. 1 which compresses the spring 48 and rocks the pawl carrier so as to cause the pawl to turn the ratchet. It will be seen that the spring 48 relieves the operating mechanism of the dial from shock when the plunger is struck by the instrument being tested. On the up-stroke, the pawl carrier is moved so as to cause the pawl to ride over the teeth of the ratchet by means of the lug 46 contacting the stop surfaces 49 of the pawl carrier.

The gage for registering the blow as herein submitted is responsive to motion of the diaphragm. It comprises a casing 60 housing a spring 61, the casing being adapted to be secured to the base and the casing being provided with a cover 62 which serves as an upper spring abutment, the lower abutment for the spring being provided by a plunger 63 carried by a stem 64. The plunger 63 carries a pin 65 which projects through a slot 67 formed in the wall of the casing, this pin being adapted to engage a suitable indicator 68. The indicator is provided with a spring member 69 which engages a suitable metal strip 70 arranged parallel to the wall of the casing. When the plunger is raised it forces the indicator 68 by means of the pin 65 upwardly and when the plunger is retracted the indicator, owing to the friction created by the spring 68 remains in its raised position and therefore indicates the maximum height to which the plunger has been raised. For operating the gage registering the blow I position beneath the diaphragm a plunger 71 adapted to be connected to the stem 64 in any suitable manner, causing the stem to be raised when the plunger 71 is forced downwardly by the diaphragm. For this purpose, I have shown a system of levers which in an obvious manner multiplies the motion of the plunger 71 so that a small movement of the same results in a corresponding greater movement of the stem 64. The plunger 71 is provided with a head 72 which contacts the diaphragm and for holding the same in such contact and to aid in taking up lost motion in the lever mechanism I provide a suitable spring 73.

For aiding the return of the plunger 3 I may provide a suitable spring 74.

Although I have submitted one specific embodiment of my invention for illustrative purposes, it is to be understood that I am not to be limited thereby to its specific mechanical details or arrangement of parts but that extensive deviations may be made therefrom without departing from the spirit of my invention.

Claims—

1. In an impact testing machine, a cylinder member, a plunger in said cylinder member, a diaphragm, a base, means clamping said diaphragm to said base and supporting said cylinder member, a fluid body interposed between said plunger and diaphragm, and means responsive to motion of said diaphragm for registering a measure of the impact imparted to said plunger.

2. In an impact testing machine, a cylinder member, a plunger in said cylinder member, a diaphragm, a base, yielding means clamping said diaphragm to said base and supporting said cylinder member, a fluid body interposed between said plunger and diaphragm, and means responsive to motion of said diaphragm for registering a measure of the impact imparted to said plunger.

3. In an impact testing machine, a base member, a diaphragm carried by said base member, a member clamping said diaphragm to said base member, a cylinder carried by said last named member, a plunger in said cylinder, a fluid body interposed between said plunger and diaphragm, and a measuring means operatively connected to said diaphragm.

4. In an impact testing machine, a vertically arranged cylinder, a diaphragm chamber below said cylinder and supporting the latter, a plunger in said cylinder and for receiving the impact to be measured, a diaphragm in said diaphragm chamber, a fluid body interposed between said plunger and said diaphragm, and a measuring means operatively connected to said diaphragm.

5. In an impact testing machine for high speed impact tools, means providing a chamber, a plunger for receiving the impact, said plunger fitting and closing the top of said chamber, a diaphragm closing the bottom of said chamber, a fluid body in said chamber, said chamber being formed to provide unrestricted communication between the portion of said fluid body adjacent said plunger and the portion thereof adjacent said diaphragm, and a measuring means operatively connected to said diaphragm.

6. In an impact testing machine, a base, a diaphragm supported on said base, a cylinder having an open end and a chambered member surrounding said end, means securing said member to said base whereby to form with said diaphragm a diaphragm chamber, a plunger in said cylinder and for receiving the impact to be measured, a fluid body interposed between said plunger and said diaphragm, and means for measuring a characteristic of said impact.

7. In an impact testing machine, the combination with a base, of the diaphragm 16, the cylinder 2 having the portion 13, the plunger 3 in said cylinder, a fluid body interposed between said plunger and diaphragm, and a measuring means actuated when impact is imparted to said plunger.

8. In an impact testing machine, an integral member forming a communicating cylinder and diaphragm chamber, a diaphragm closing said diaphragm chamber, a plunger for receiving the impact closing said cylinder, a liquid body in said cylinder and said diaphragm chamber, and a measuring means adapted to be actuated when impact is imparted to said plunger.

9. In an impact testing machine, a cylinder having an open end, means providing a diaphragm chamber carried by said cylinder at the open end thereof, a diaphragm closing said chamber, a plunger in said cylinder, and a liquid body interposed between said plunger and said diaphragm.

10. In an impact testing machine, a diaphragm chamber, a communicating cylinder, a plunger in said cylinder, a diaphragm in said diaphragm chamber, and a resilient connection between said diaphragm and plunger.

11. In an impact testing machine, a chamber for a fluid body, a plunger and a diaphragm forming part of the wall of said chamber, and a resilient connection between said diaphragm and plunger.

12. In an impact testing machine, a diaphragm chamber, a vertically arranged cylinder opening into said chamber, a plunger in said cylinder, a diaphragm in said diaphragm chamber, and a compression spring between said plunger and diaphragm.

13. In an impact testing machine, a diaphragm, means subjecting the force of such impact to said diaphragm, and means supporting the edges of said diaphragm and in rolling contact therewith.

14. In an impact testing machine, a diaphragm, means subjecting the force of such impact to said diaphragm, and yielding means supporting the edges of said diaphragm and in rolling contact therewith.

15. In an impact testing machine, a diaphragm, means subjecting the force of such impact to said diaphragm, securing means clamping the edges of said diaphragm, and a yielding connection between the clamping portions of said securing means.

16. In an impact testing machine, a diaphragm, means subjecting the force of such impact to said diaphragm, and means providing a rocker support for the periphery of said diaphragm.

17. In an impact testing machine, a diaphragm, means subjecting the force of such impact to said diaphragm, a rocker support for the periphery of said diaphragm, and means for holding said support in position.

18. In an impact testing machine, a diaphragm, means subjecting the force of such impact to said diaphragm, a rocker support for the periphery of said diaphragm, and means for yieldingly holding said support in position.

19. In an impact testing machine, a diaphragm, means subjecting the force of such impact to said diaphragm, a ring providing a rocker support for said diaphragm, and means for holding said ring in position.

20. In an impact testing machine, a diaphragm, means subjecting the force of such impact to said diaphragm, a ring providing a rocker support for said diaphragm, and means for yieldingly holding said ring in position.

21. In an impact testing machine, a diaphragm, means subjecting the force of such impact to said diaphragm, a pair of rings providing a rocker support for said diaphragm, and means for holding said rings in position.

22. In an impact testing machine, a diaphragm, means subjecting the force of such impact to said diaphragm, a pair of rings providing a rocker support for said diaphragm, and means for yieldingly holding said rings in position.

23. In an impact testing machine, the combination with a diaphragm and means for supporting said diaphragm and forming therewith a diaphragm chamber, of the rings 18 on which said diaphragm is supported, and the packing 19 for preventing leakage.

24. In an impact testing machine, a base, means providing a chamber for a fluid body adapted to have imparted thereto such impact, an impact receiving member for applying the impact to said fluid body, and a support for the impact producing instrument carried by said means.

25. In an impact testing machine, a plunger for receiving the impact of the impact producing instrument to be tested, means providing a plunger chamber, and a support for the impact producing instrument carried by said means.

26. In an impact testing machine, a diaphragm, means providing a diaphragm chamber, an impact receiving member, and a support for the impact producing instrument carried by said means.

27. In an impact testing machine, a cylinder, a plunger therein for receiving the impact of the impact producing instrument to be tested, means for supporting the impact producing instrument in operative relation to said plunger, said means being carried by said cylinder.

28. In an impact testing machine, a base, means carried by said base providing a plunger and a diaphragm chamber, a plunger in said plunger chamber for receiving the impact of the impact producing instrument to be tested, a support for the instrument to be tested, said support being carried by said means.

29. In an impact testing machine, a cylinder 2, the plunger 3 projecting from said cylinder; and an impact instrument support having the portion 7 and connected portion 6, the latter carried by said cylinder.

30. In an impact testing machine, means providing a chamber, a fluid body in said chamber, means for imparting the impact of the instrument to be tested to said fluid body, an accumulator having means for maintaining fluid therein under constant pressure, a connection between said accumulator and chamber, means for permitting flow from said accumulator to said chamber, and means for preventing any flow from said chamber to said accumulator.

31. In an impact testing machine, means providing a chamber, a movable wall for said chamber, a register responsive to movement of said wall, a fluid body in said chamber, means for imparting the impact of the instrument to be tested by said fluid body, an accumulator having means for maintaining fluid therein under constant pressure, a connection between said accumulator and chamber, means for permitting flow from said accumulator to said chamber, and means for preventing any flow from said chamber to said accumulator.

32. In an impact testing machine, means providing a chamber, a fluid body in said chamber, means for imparting the impact of the instrument to be tested to said fluid body, a second chamber, means for maintaining fluid in said second chamber under constant pressure, conduit means connecting said chambers, and means for permitting flow from said second to said first chamber and for preventing any flow in the opposite direction.

33. In an impact testing machine, means providing a chamber, a fluid body in said chamber for receiving the impact of the instrument to be tested, a second chamber, means for maintaining the fluid in said second chamber under a predetermined pressure, conduit means connecting said chambers, and means for permitting flow from said second to said first chamber and for preventing any flow in the opposite direction.

34. In an impact testing machine, means providing a chamber, a fluid body in said chamber, means for replenishing leakage from said chamber comprising a second fluid containing chamber, means for maintaining the fluid in said second chamber under constant pressure, conduit means connecting said chambers, and means for permitting flow from said second to said first chamber and for preventing any flow in the opposite direction.

35. In an impact testing machine, means forming a chamber comprising a pair of movable walls, a fluid body interposed between said walls, a chamber communicating with the first chamber, a plunger in the last chamber, and means for exerting a constant pressure on said plunger.

36. In an impact testing machine, means forming a chamber comprising a pair of movable walls, a fluid body interposed between said walls, a chamber communicating with the first chamber, a plunger in the last chamber, means for exerting a constant pressure on said plunger, and means for varying said pressure.

37. The combination with the liquid chamber of a liquid impact measuring device, of a dead-weight accumulator in fluid communication with said chamber, and means for imparting the impact to be measured to the liquid in said liquid chamber.

38. The combination with the liquid chamber of a liquid impact measuring device, of a dead-weight accumulator conduit means establishing communication between said liquid chamber and accumulator, and a check valve in said conduit means for preventing flow from said chamber to said accumulator.

39. In an impact testing machine, means comprising a register for a characteristic of such impact, a movable member adapted to be operated by such impact, a transmission between said register and member, said transmission comprising means adapted to yield upon delivery of the impact effect to member.

40. A counter for a movable member comprising a dial, ratchet and pawl mechanism for turning said dial, a rocking carrier for said pawl, operating means for said carrier, and a resilient connection between said carrier and operating means.

41. In an impact testing machine, a chamber containing a liquid body, means for imparting the impact to be tested to said liquid body, and automatically acting means for maintaining said liquid body under a predetermined initial pressure.

42. In an impact testing machine, a chamber containing a liquid body, means for imparting the impact to be tested to said liquid body, automatically acting means for maintaining said liquid body under a predetermined initial pressure, and means for varying the degree of said initial pressure.

In testimony whereof, I have signed my name to this specification.

GEORGE H. GILMAN.